United States Patent
Wang et al.

(10) Patent No.: US 12,418,707 B2
(45) Date of Patent: Sep. 16, 2025

(54) NETWORK DEVICE, METHOD AND COMPUTER-READABLE MEDIUM FOR VIDEO CONTENT PROCESSING

(71) Applicant: ARRIS Enterprises LLC, Suwanee, GA (US)

(72) Inventors: Qi Wang, Shanghai (CN); Wan-Ting Yang, Shanghai (CN); Luyan Sun, Shanghai (CN); Min Wei, Shanghai (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/725,822

(22) Filed: Apr. 21, 2022

(65) Prior Publication Data

US 2023/0007367 A1    Jan. 5, 2023

(30) Foreign Application Priority Data

Jul. 2, 2021 (CN) .......................... 202110747743.5

(51) Int. Cl.
*H04N 21/8549* (2011.01)
*H04N 21/422* (2011.01)
*H04N 21/435* (2011.01)
*H04N 21/845* (2011.01)

(52) U.S. Cl.
CPC ..... *H04N 21/8549* (2013.01); *H04N 21/4221* (2013.01); *H04N 21/435* (2013.01); *H04N 21/8456* (2013.01)

(58) Field of Classification Search
CPC ........... H04N 21/8549; H04N 21/4221; H04N 21/435; H04N 21/8456
USPC ......................................................... 386/241
See application file for complete search history.

(56) References Cited

U.S. PATENT DOCUMENTS

| | | | | |
|---|---|---|---|---|
| 5,311,373 | A * | 5/1994 | Murabayashi | G11B 15/07 386/323 |
| 8,441,577 | B2 * | 5/2013 | Davis | H04N 21/4852 348/515 |
| 10,397,522 | B2 * | 8/2019 | Chen | H04N 21/84 |
| 11,170,819 | B2 * | 11/2021 | Brinkman, Jr. | H04N 21/8456 |
| 11,363,353 | B2 * | 6/2022 | Li | H04N 21/8456 |
| 11,412,305 | B2 * | 8/2022 | Fano | H04N 21/23418 |
| 11,582,536 | B2 * | 2/2023 | Packard | H04N 21/251 |
| 11,930,252 | B2 * | 3/2024 | Liu | H04N 21/4826 |

(Continued)

FOREIGN PATENT DOCUMENTS

| | | |
|---|---|---|
| CN | 105491456 | 4/2016 |
| CN | 109309878 | 2/2019 |

*Primary Examiner* — Helen Shibru
(74) *Attorney, Agent, or Firm* — Wenderoth, Lind & Ponack, L.L.P.

(57) ABSTRACT

Network device, method and computer-readable medium for video content processing. The network device comprises a memory having instructions stored thereon and a processor configured to execute the instructions stored on the memory to cause the network device to perform the following operations: Acquiring metadata of video content, wherein the video content comprises a plurality of segments, and the metadata represents evaluations from a plurality of users for at least one of the plurality of segments; according to the metadata and the preference information of the local users, generating highlights of the video content for the local users to play.

22 Claims, 6 Drawing Sheets

(56) References Cited

U.S. PATENT DOCUMENTS

2018/0253173 A1\* 9/2018 Reiley .................... G06F 3/048
2021/0160581 A1\* 5/2021 Difrancesco ....... H04N 21/4884
2021/0181927 A1\* 6/2021 Hughes .............. H04N 21/4781

\* cited by examiner

Fig. 6

NETWORK DEVICE, METHOD AND COMPUTER-READABLE MEDIUM FOR VIDEO CONTENT PROCESSING

TECHNICAL FIELD

The present disclosure relates to video content processing, and more particularly, to network devices, methods, computer-readable media, and computer program products for video content processing.

BACKGROUND ART

Internet TV can integrate a variety of content resources, and broadcast TV programs live or on demand. With the development of Internet TV, users' demand for interaction is increasing day by day.

SUMMARY OF THE INVENTION

The present disclosure relates to network devices, methods, computer-readable media and computer program products for video content processing.

Some aspects of the present disclosure relate to a network device including a memory and a processor. The memory has instructions stored thereon; and the processor is configured to execute instructions stored on the memory to cause the network device to perform the following operations: Acquiring metadata of video content, wherein the video content comprises a plurality of segments, and the metadata represents evaluations from a plurality of users for at least one of the plurality of segments; according to the metadata and the preference information of the local users, generating highlights of the video content for the local users to play.

In some embodiments, for the above network device, the metadata includes: the evaluation type of evaluation, and the number of evaluations corresponding to the evaluation type.

In some embodiments, for the above-mentioned network device, wherein the metadata includes the number of evaluations, the processor is further configured to execute instructions stored on the memory to cause the network device to perform the following operations: Generating highlights of the video content based on a predetermined number of segments with the largest number of evaluations, wherein the predetermined number is preset by the user or is a default value.

In some embodiments, for the above-mentioned network device, wherein the preference information of the local user includes the weight set by the local user for each evaluation type, the processor is further configured to execute instructions stored on the memory to cause the network device to perform the following operations: according to the weight set by the local users for each evaluation type, for each segment in the at least one segment, calculating the weighted sum of the evaluation number of each evaluation type based on the corresponding weight as the weighted total evaluation number of the segment; and generating highlights of the video content based on a predetermined number of segments with the largest number of weighted total evaluations.

In some embodiments, for the above network device, the processor is further configured to execute instructions stored on the memory to cause the first network device to perform the following operations: For each evaluation type, based on the predetermined number of segments with the largest number of evaluations corresponding to the evaluation type, generating the highlights of the video content corresponding to the evaluation type; and providing the list of highlights based on the evaluation type to the local users, from which the local users may select the highlights to be played.

In some embodiments, for the above network device, obtaining metadata of the video content further comprises: In the process of playing video content, receiving from the plurality of users the evaluations for the current playing time that are entered by the plurality of users by using predetermined buttons on the remote controller or other terminals, wherein the current playing time corresponds to a segment of the video content; and counting the evaluation type and the corresponding evaluation number according to the received evaluations by segment so as to obtain the metadata.

In some embodiments, for the above network device, obtaining metadata of the video content further comprises: Determining the evaluation type of evaluation by detecting the predetermined color button on the remote controller that is pressed, wherein different predetermined color buttons respectively correspond to different evaluation types.

In some embodiments, for the above network device, obtaining metadata of the video content further comprises: Determining the specific evaluation content of the evaluation by detecting that the predetermined color button on the remote controller is pressed and then within a threshold time period the predetermined digital button on the remote controller is pressed, wherein the specific evaluation content includes emoticons, kaomojis or other global universal characters; and classifying the evaluations according to specific evaluation contents to determine the evaluation type of the evaluations.

Other aspects of the present disclosure relate to a method performed by a network device, wherein the method comprises: Acquiring metadata of video content, wherein the video content comprises a plurality of segments, and the metadata represents evaluations from a plurality of users for at least one of the plurality of segments; according to the metadata and the preference information of the local users, generating highlights of the video content for the local users to play.

In some embodiments, in the above method, the metadata includes: the evaluation type of evaluation, and the number of evaluations corresponding to the evaluation type.

In some embodiments, in the above method, the metadata includes the evaluation number of evaluations, and generating highlights of the video content for the local users further comprises: Generating highlights of the video content based on a predetermined number of segments with the largest number of evaluations, wherein the predetermined number is preset by the user or is a default value.

In some embodiments, in the above method, the preference information of the local users includes weights set by the local users for each evaluation type, and generating highlights of the video content for the local users further comprises: according to the weight set by the local users for each evaluation type, for each segment in the at least one segment, calculating the weighted sum of the evaluation number of each evaluation type based on the corresponding weight as the weighted total evaluation number of the segment; and generating highlights of the video content based on a predetermined number of segments with the largest number of weighted total evaluations.

In some embodiments, in the above method, generating highlights of the video content for the local users further comprises: For each evaluation type, based on the predetermined number of segments with the largest number of evaluations corresponding to the evaluation type, generating the highlights of the video content corresponding to the evaluation type; and providing the list of highlights based on the evaluation type to the local users, from which the local users may select the highlights to be played.

In some embodiments, in the above method, obtaining the metadata of video content further comprises: In the process of playing video content, receiving from the plurality of users the evaluations for the current playing time that are entered by the plurality of users by using predetermined buttons on the remote controller or other terminals, wherein the current playing time corresponds to a segment of the video content; and counting the evaluation type and the corresponding evaluation number according to the received evaluations by segment so as to obtain the metadata.

In some embodiments, in the above method, obtaining the metadata of video content further comprises: Determining the evaluation type of evaluation by detecting the predetermined color button on the remote controller that is pressed, wherein different predetermined color buttons respectively correspond to different evaluation types.

In some embodiments, for the above method, obtaining metadata of the video content further comprises: Determining the specific evaluation content of the evaluation by detecting that the predetermined color button on the remote controller is pressed and then within a threshold time period the predetermined digital button on the remote controller is pressed, wherein the specific evaluation content includes emoticons, kaomojis or other global universal characters; and classifying the evaluations according to specific evaluation contents to determine the evaluation type of the evaluations.

Other aspects of the present disclosure relate to a non-transitory computer-readable medium having instructions stored thereon, which, when executed by a processor of a network device, cause the network device to perform the following operations: Acquiring metadata of video content, wherein the video content comprises a plurality of segments, and the metadata represents evaluations from a plurality of users for at least one of the plurality of segments; according to the metadata and the preference information of the local users, generating highlights of the video content for the local users to play.

In some embodiments, for the above non-transitory computer-readable medium, the metadata includes: the evaluation type of evaluation, and the number of evaluations corresponding to the evaluation type.

In some embodiments, for the above-mentioned non-transitory computer-readable medium, the metadata includes the evaluation number of evaluations, and the non-transitory computer-readable medium further includes instructions that, when executed by the processor of a network device, cause the network device to perform the following operations: Generating highlights of the video content based on a predetermined number of segments with the largest number of evaluations, wherein the predetermined number is preset by the user or is a default value.

In some embodiments, in the above-mentioned non-transitory computer-readable medium, the preference information of the local users includes weights set by the local users for each evaluation type, and the non-transitory computer-readable medium further includes instructions that, when executed by the processor of a network device, cause the network device to perform the following operations: according to the weight set by the local users for each evaluation type, for each segment in the at least one segment, calculating the weighted sum of the evaluation number of each evaluation type based on the corresponding weight as the weighted total evaluation number of the segment; and generating highlights of the video content based on a predetermined number of segments with the largest number of weighted total evaluations.

In some embodiments, the above-mentioned non-transitory computer-readable medium further comprises, for each evaluation type, based on the predetermined number of segments with the largest number of evaluations corresponding to the evaluation type, generating the highlights of the video content corresponding to the evaluation type; and providing the list of highlights based on the evaluation type to the local users, from which the local users may select the highlights to be played.

In some embodiments, the non-transitory computer-readable medium further comprises instructions that, when executed by the processor of a network device, cause the network device to perform the following operations: In the process of playing video content, receiving from the plurality of users the evaluations for the current playing time that are entered by the plurality of users by using predetermined buttons on the remote controller or other terminals, wherein the current playing time corresponds to a segment of the video content; and counting the evaluation type and the corresponding evaluation number according to the received evaluations by segment so as to obtain the metadata.

In some embodiments, the non-transitory computer-readable medium further comprises instructions that, when executed by the processor of a network device, cause the network device to perform the following operations: Determining the evaluation type of evaluation by detecting the predetermined color button on the remote controller that is pressed, wherein different predetermined color buttons respectively correspond to different evaluation types.

In some embodiments, the non-transitory computer-readable medium further comprises instructions that, when executed by the processor of a network device, cause the network device to perform the following operations: Determining the specific evaluation content of the evaluation by detecting that the predetermined color button on the remote controller is pressed and then within a threshold time period the predetermined digital button on the remote controller is pressed, wherein the specific evaluation content includes emoticons, kaomojis or other global universal characters; and classifying the evaluations according to specific evaluation contents to determine the evaluation type of the evaluations.

Some other aspects of the present disclosure relate to a computer program product including instructions that, when executed by one or more processors, cause the execution of the method described above.

BRIEF DESCRIPTION OF THE ATTACHED DRAWINGS

In order to better understand the present disclosure and show how to implement, description will now be made by way of examples with reference to the accompanying drawings, noting that similar reference numerals refer to the corresponding parts throughout the drawings. In which.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached Claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

As mentioned above, with the development of internet TV, users' demand for interaction is increasing day by day.

For example, users may want to send comment messages to express their feelings or view other users' evaluations on videos while watching video programs. Bullet screen is a kind of commentary subtitle that pops up when watching videos, which is very popular among content providers, especially in East Asian cultural circles. However, compared with Asian characters which are suitable for scrolling display (whether in rows or columns), some languages such as English may not be so suitable for scrolling viewing. In addition, at present, most of the bullet messages are edited and entered by mobile terminal or personal computer (PC), while it may not be so fast and convenient as entering through TV and its STB.

For another example, for a video program, the user may also want to preview or evaluation some highlights of the video program. At present, the highlights are usually generated on the server side based on the segments manually marked by managers, which need to be downloaded and watched by the device on the TV terminal side. This may consume and occupy the computing resources and network performance on the network side, and it is difficult to match the personalized needs of the local users in time, which affects the interactive experience of users when watching TV programs.

Therefore, the present disclosure seeks to provide a richer interactive experience by using network devices, terminals, servers and other devices. During the video playing process, multiple users can enter several types of evaluations on video segments by pressing the predetermined buttons on their respective remote controllers or other devices, and these evaluations can be displayed in the form of bullet messages during the video playing process. By summarizing and counting multiple evaluations from multiple users, highlights can be generated for the local users that meet their individual needs. The local users can conduct jump-playing of the generated highlights to watch the content they are interested in and get a richer interactive experience.

Figure 1:
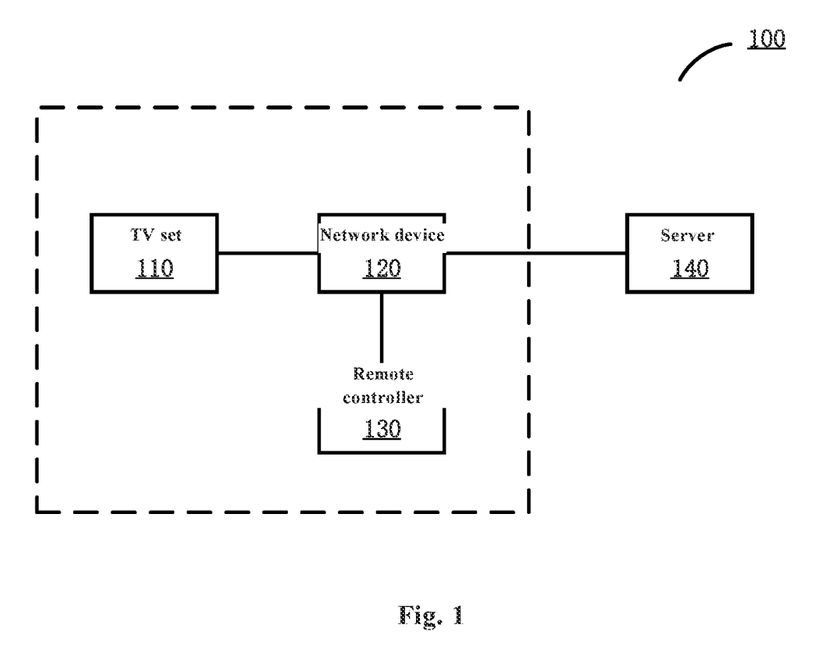
FIG. 1 is a schematic diagram showing an example system environment according to an embodiment of the present disclosure.

FIG. 1 is a schematic diagram showing an example system environment according to an embodiment of the present disclosure.

Referring to FIG. 1, the exemplary system environment may include a server 140 on the server side, a TV 110, a network device 120, a remote controller 130, and the like on the terminal side. Although FIG. 1 shows only one group of terminal side devices, the present disclosure may include a plurality of groups of terminal side devices used by a plurality of users.

In some embodiments, the network device 120 (which may be a STB, for example) can receive various types of communication from the remote controller 130 and/or send various types of communication to the TV set 110, and perform various types of communication with the server 140. For example, the TV 110 may receive one or more data services, one or more audio/video services and/or other services from the server 140 through the network device 120. In another example, the remote controller 130 can include a STB remote controller and/or a TV remote controller, which can control the input to the STB or TV, and a part of the input can be sent to the server 140 for storage or processing after being processed by the STB.

In some embodiments, the TV 110 can include various types of display devices, including but not limited to Internet Protocol TV (IPTV) based on telecommunication private network, Internet TV based on public Internet, Internet TV, or various electronic display devices integrating the functions of playing and displaying video programs, TV programs or live programs. Note: This disclosure refers it as TV 110 for convenience of understanding, but this disclosure is not limited thereto.

The network device 120 may be various types of network devices connecting the TV 110 with external signal sources, and may be, for example, a STB capable of converting acquired digital signals into TV contents and displaying them on the TV 110. The STB can be a digital TV STB for receiving cable TV (DVB-C), a digital TV STB for receiving digital satellite TV (DVB-S), a digital TV STB for receiving terrestrial broadcast TV (DVB-T). In some embodiments, the network device 120 may be a device located outside the TV 110 or a module or function integrated in the TV 110. Note: The present disclosure does not specifically limit the type of the network device 120.

The remote controller 130 may be a device that controls input to a STB or a TV, and may also be a limited device that is inconvenient to quickly enter words and phrases. The remote controller 130 may also be an STB remote controller and/or a TV remote controller or other types of input-limited devices. Generally, the traditional remote controller includes color buttons (for example, red, green, yellow and blue buttons), and can also include number buttons (for example, 0-9 number buttons). In some embodiments, by pressing a specific button on the remote control, the corresponding predefined evaluation can be quickly entered. In some embodiments, by pressing a button on the remote controller, jumping and playing of segments or selection of corresponding segment can be performed.

The server 140 may be an operator network, the Internet, etc. According to embodiments of the present disclosure, the server 140 may store, process and provide video/audio content to be played on the TV 110, the metadata of the played content, etc. In addition, during the video playing process, the evaluation entered by the user can be sent to the server 140 via the network device 120 for storage and processing. Note: The present disclosure does not specifically limit the type of the server 140.

Figure 2:
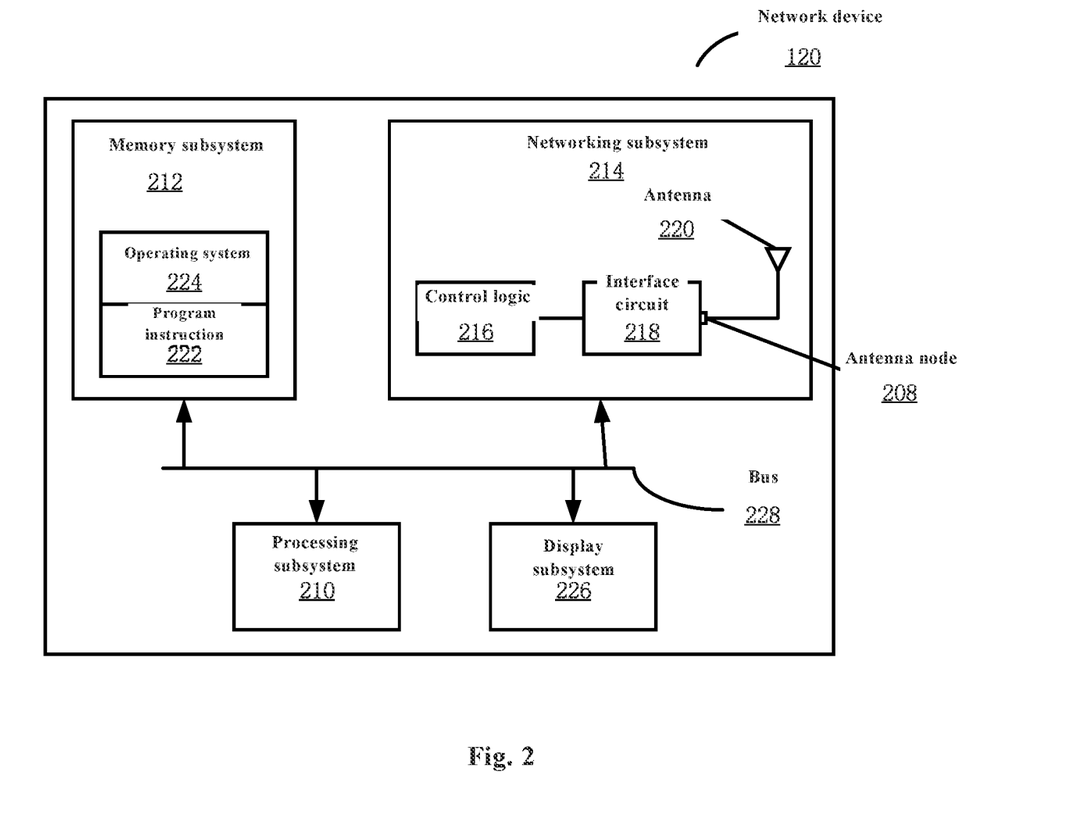
FIG. 2 is a schematic diagram showing a network device according to an embodiment of the present disclosure.

Now, with reference to FIG. 2, we will describe an embodiment of a network device (referred to herein as a first network device 120), which can perform at least some operations according to the embodiments of the present disclosure in communication technology. The network device 120 may comprise a processing subsystem 210, a memory subsystem 212, and a networking subsystem 214.

The processing subsystem 210 comprises one or a plurality of devices configured to perform computing operations. The processing subsystem 210 provides various functions of the network device 120. In some embodiments, the processing subsystem 210 is configured to perform operations for video content processing. For example, the processing subsystem 210 may comprise one or a plurality of microprocessors, ASICs, microcontrollers, programmable logic devices, Graphic Processing Units (GPU), and/or one or a plurality of Digital Signal Processors (DSP). The processing subsystem 210 may execute various program instructions stored in the memory subsystem 212 to perform corresponding operations, for example, to execute various program instructions to realize the methods shown in FIG. 3 and FIG. 5.

The memory subsystem 212 comprises one or a plurality of devices for storing data and/or instructions used for the processing subsystem 210 and the networking subsystem 214. For example, the memory subsystem 212 may comprise a dynamic random access memory (DRAM), a static random access memory (SRAM), and/or other types of memory (sometimes collectively or individually referred to as "computer-readable storage medium"). In some embodiments, the instructions used in the memory subsystem 212 of the processing subsystem 210 comprise: one or a plurality of program modules or instruction sets (for example, a program instruction 222 or an operating system 224), which can be executed by the processing subsystem 210. It should be noted that one or a plurality of computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, e.g., as configurable or configured (used interchangeably in this discussion), for executing by the processing subsystem 210 to realize the functions of the present disclosure.

In addition, the memory subsystem 212 may comprise mechanism for controlling access to memory. In some embodiments, the memory subsystem 212 comprises a memory hierarchy, and the memory hierarchy comprises one or a plurality of high-speed caches coupled to the memory in the first network device 120. In some of these embodiments, one or a plurality of the high-speed caches are located in the processing subsystem 210.

In some embodiments, the memory subsystem 212 is coupled to one or a plurality of high-capacity mass storage devices (not shown). For example, the memory subsystem 212 may be coupled to a magnetic or optical driver, a solid state driver, or another type of mass storage device. In these embodiments, the network device 120 may use the memory subsystem 212 as a fast-access storage of frequently used data, while the mass storage device may be used to store infrequently used data.

The networking subsystem 214 comprises one or a plurality of devices configured to be coupled to a wired and/or wireless network and to communicate over the wired and/or wireless network (i.e., to perform network operations), including: control logic 216, an interface circuit 218, and one or a plurality of antennas 220 (or antenna elements). (Although FIG. 2 includes one or a plurality of antennas 220, in some embodiments, the network device 120 comprises one or a plurality of nodes that can be coupled to one or a plurality of antennas 220, such as node 208. Therefore, the electronic device 120 may include or not include one or a plurality of antennas 220.) For example, the networking subsystem 214 may comprise a Bluetooth networking system, a cellular networking system (for example, 3G/4G/5G networks, such as UMTS and LTE), a USB networking system, a networking system based on standards described in IEEE 802.11 (for example, Wi-Fi networking system), Ethernet networking system, and/or another networking system.

In the network device 120, a bus 228 is used to couple the processing subsystem 210, the memory subsystem 212, and the networking subsystem 214 together. The bus 228 may comprise electrical, optical, and/or electro-optical connections of the subsystems through which commands, data and the like may be transmitted. Although only one bus 228 is shown for clarity, different embodiments may comprise different numbers or configurations of electrical, optical, and/or electro-optical connections in the subsystems.

In some embodiments, the network device 120 comprises a display subsystem 226 for displaying information on a display device, which may comprise a display driver and a display, such as a liquid crystal display and a multi-touch screen, etc.

The network device 120 may be (or may be included in) any electronic device having at least one network interface capable of connecting the TV 110 with an external signal source. For example, the network device 120 may be (or may be included in): an STB, an on-board box, an integrated box, a smart box, a smart TV, an Internet TV, a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, a test device, and/or other electronic devices.

Although specific components are used to describe the network device 120, in alternative embodiments, different components and/or subsystems may exist in the network device 120. For example, the network device 120 may comprise one or a plurality of additional processing subsystems, memory subsystems, networking subsystems, and/or display subsystems. In addition, the network device 120 may not have one or a plurality of the subsystems. Furthermore, in some embodiments, the network device 120 may include one or more additional subsystems not shown in FIG. 2. Also, although separate subsystems are shown in FIG. 2, in some embodiments, some or all of the given subsystems or components may be integrated into one or a plurality of the other subsystems or components in the network device 120. For example, in some embodiments, the program instruction 222 is incorporated in the operating system 224, and/or the control logic 216 is incorporated in the interface circuit 218.

Although Wi-Fi and/or Ethernet communication protocols are used in the above discussion as illustrative examples, in other embodiments, various communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be implemented by hardware, software, or both. For example, at least some operations in the communication technology can be implemented using the program instruction 222, the operating system 224 (e.g., a driver for the interface circuit 218), or firmware in the interface circuit 218. Alternatively or in addition, at least some operations in the communication technology may be implemented at physical layer, e.g., hardware in the interface circuit 218.

Figure 3:
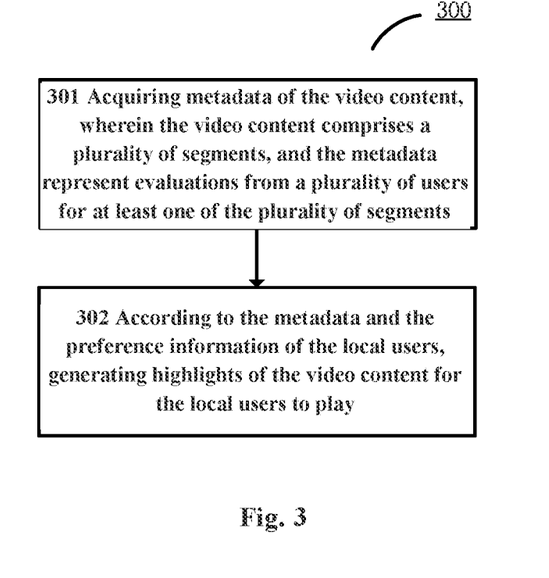
FIG. 3 is a schematic diagram of an exemplary method executed by a network device according to an embodiment of the present disclosure.

FIG. 3 is a schematic diagram of an exemplary method 300 executed by the network device 120 according to an embodiment of the present disclosure. Combined with the system environment shown in FIG. 1, the network device 120 executing the method 300 can connect the TV 110 with an external signal source (or server 140), and convert the acquired digital signal into TV content and display it on the TV 110.

The method 300 may include, in operation step 301, obtaining the metadata of video content, wherein the video content includes a plurality of segments, and the metadata represents evaluations from a plurality of users for at least one of the plurality of segments.

Figure 6:
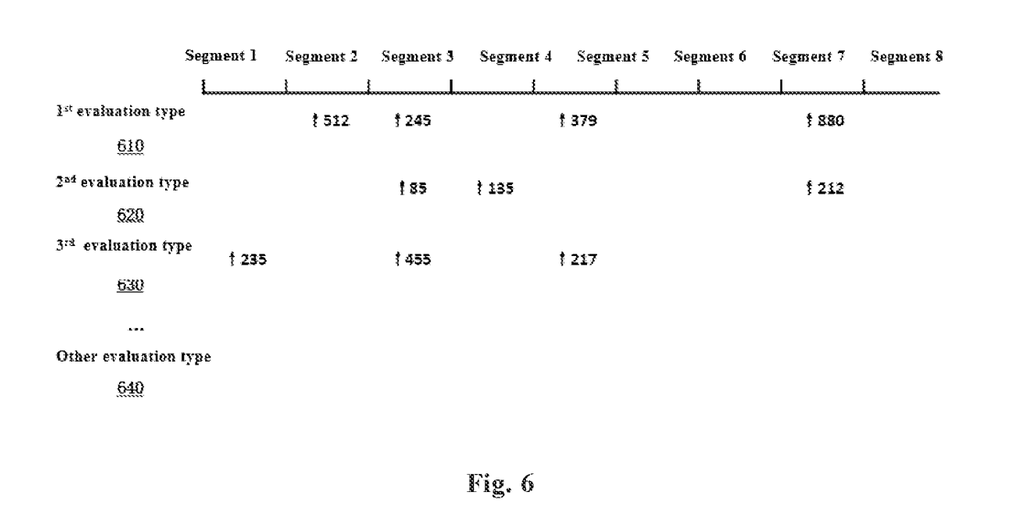
FIG. 6 is a schematic diagram showing a segment of video content according to an embodiment of the present disclosure.

The segments of the video content can be preset. For example, video content can be equally segmented in a length of 5 seconds, 30 seconds, 2 minutes, etc. Such an example can be as shown in FIG. 6. In this way, a certain playing moment when the user evaluation is entered can correspond to a certain segment of video content.

In some other embodiments, because the number of evaluations of highlights by users may be similar to a normal distribution, the segment length of each highlight can also be determined based on the expected value position and standard deviation and the threshold number of evaluations, wherein the length can be variable.

Operation step 301 will be further described below in conjunction with the exemplary method 500 of FIG. 5.

Referring to FIG. 3 continuously, the method 300 may further comprise, in operation 302, generating highlights of the video content for the local users to play according to the metadata and the preference information of the local users.

Operation step 302 will be further described below in conjunction with the exemplary methods 400*a*-400*c* of FIGS. 4A-4C.

Figure 4A:
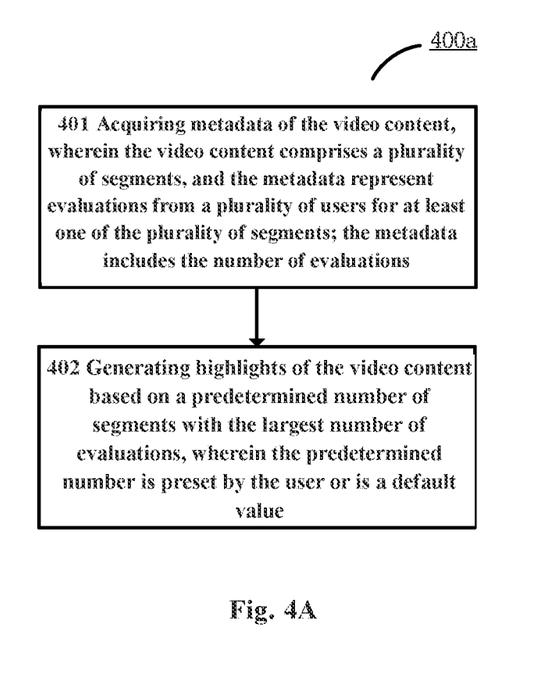
FIGS. 4A-4C are schematic diagrams of other exemplary methods executed by network devices according to embodiments of the present disclosure.
Figure 4B:
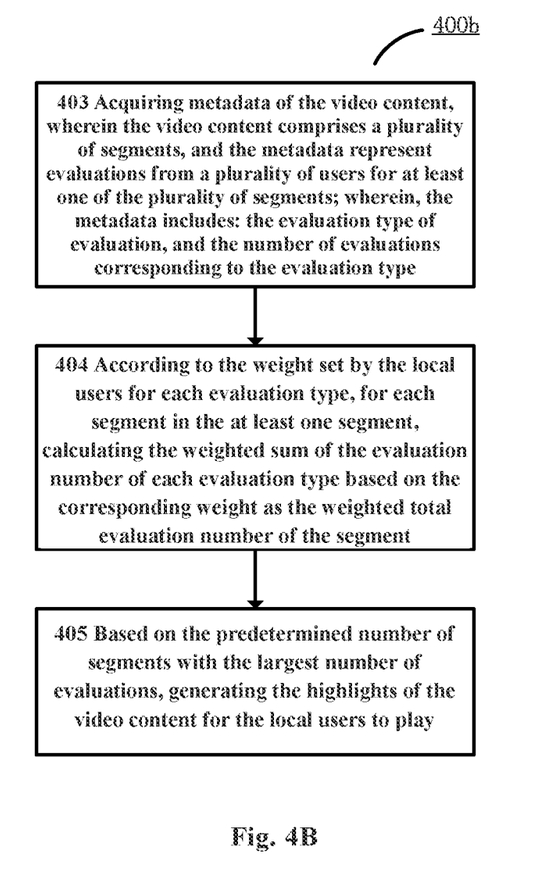
Figure 4C:
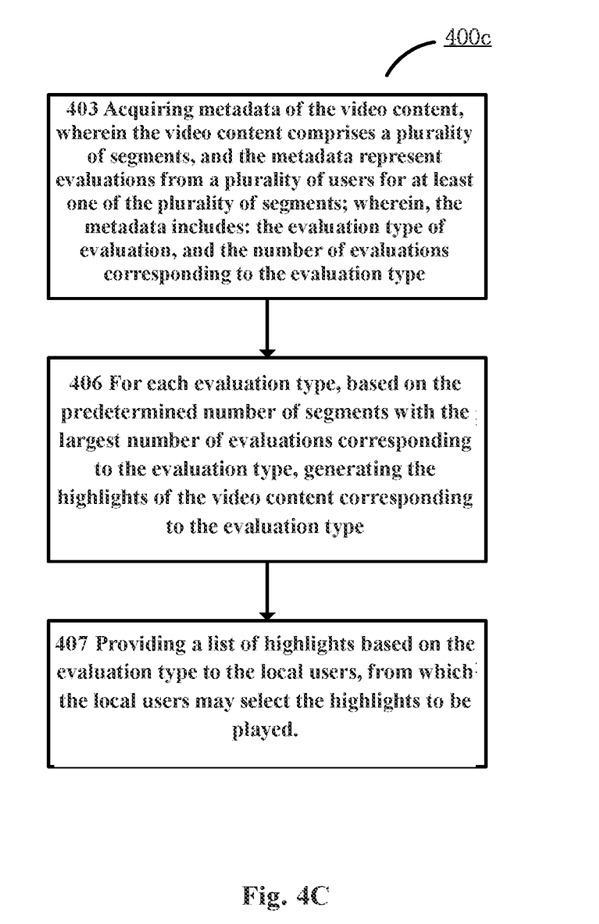

FIGS. 4A-4C illustrate exemplary methods 400*a*-400*c* for generating highlights of the video content according to embodiments of the present disclosure. The methods 400*a*-400*c* may be performed by the network device 120 shown in FIG. 1.

Referring to FIG. 4A, the method 400*a* comprises, in operation step 401, obtaining the metadata of video content, wherein the video content includes a plurality of segments, and the metadata represents evaluations from a plurality of users for at least one of the plurality of segments. The metadata includes the evaluation number of evaluations.

For example, the metadata of video content can represent the following: In the video content, segment 1 includes 235 evaluations, segment 2 includes 512 evaluations, segment 3 includes 785 evaluations, segment 4 includes 135 evaluations, segment 5 includes 596 evaluations, segments 6 and 7 include 0 evaluation, segment 8 includes 1092 evaluations, etc.

Referring to FIG. 4A continuously, the method 400*a* may further comprise, in operation step 402, generating highlights of the video content based on a predetermined number of segments with the largest number of evaluations. In some embodiments, the predetermined number can be preset by the user or be a default value, for example, it can be set to 5 segments. Taking the above as example, the five segments (i.e., segments 1, 2, 3, 5 and 8) with the largest number of evaluations can be provided as highlights for the local users to play.

The method of generating highlights is not limited to this. For example, it can also be based on a predetermined threshold number of evaluations, e.g., more than 200 evaluated segments are used as highlights; or it can be based on a certain percentage of evaluations, for example, segments that exceed 10% of the total evaluation number of the whole video can be taken as highlights. The choice of these schemes and the setting of numerical values can be set by users according to their own preferences.

FIG. 4B illustrates another exemplary method 400*b* for generating highlights of the video content according to an embodiment of the present disclosure. Compared with the method 300 and the method 400*a*, the method 400*b* also introduces the evaluation type of evaluations as one of the bases for generating highlights.

Referring to FIG. 4B, the method 400*b* may comprise, in operation 403, obtaining metadata of the video content, wherein the video content includes a plurality of segments, and the metadata represents evaluations from a plurality of users for at least one of the plurality of segments. The metadata includes: the evaluation type of evaluation, and the number of evaluations corresponding to the evaluation type.

An example of metadata will be described with reference to the example in FIG. 6. The evaluation types may include, for example, a first evaluation type 610, a second evaluation type 620, a third evaluation type 630, etc. For example, the first evaluation type 610 may indicate joy, happiness, etc., the second evaluation type 620 may indicate sorrow, sadness, crying, etc., and the third evaluation type 630 may indicate excitement, wonderfulness, praise, etc. The evaluation types of evaluations may not be limited to those listed above, and may also be selected and set by the users from the option library of evaluation types. According to the example of FIG. 6, the metadata of video content can represent the following: Segment 1 includes 235 evaluations of the third evaluation type, segment 2 includes 512 evaluations of the first evaluation type, segment 3 includes 245 evaluations of the first evaluation type, 85 evaluations of the second evaluation type and 455 evaluations of the third evaluation type, etc. Note: In the present disclosure, the data structure of metadata may vary according to embodiments, and may not be limited to the forms or contents listed above.

Referring to FIG. 4B continuously, the method 400*b* may further comprise, in operation step 404, according to the weight set by the local users for each evaluation type, calculating the weighted sum of the evaluation number of each evaluation type based on the corresponding weight for each segment as the weighted total evaluation number of the segment.

For example, if the user prefer to watch highlights related to the first evaluation type, followed by the second evaluation type, assuming that the weights set by the user for the first, second, third and other evaluation types are 0.5, 0.3, 0.1 and 0.1, respectively, the weighted sum can be calculated for each segment according to the weights set by the user. Taking the above as example, the weighted total evaluation number of each segment is: 23.5 for segment 1, 256 for segment 2, 193.5 for segment 3, 40.5 for segment 4, 211.2 for segment 5, 0 for segments 6 and 7, and 503.6 for segment 8.

Referring to FIG. 4B continuously, the method 400b may further comprise, in operation step 405, generating highlights of the video content based on a predetermined number of segments with the largest number of weighted total evaluations. In some embodiments, the predetermined number can be preset by the user or be a default value, for example, it can be set to 3 segments. Taking the above as example, the three segments with the largest number of weighted total evaluations (i.e., segments 2, 5 and 8) can be provided as highlights for the local users to play.

Similar to the method 400a, it is also possible to generate highlights of video content based on a predetermined threshold number of evaluations or based on a certain percentage number of evaluations.

By setting the evaluation type, the method 400b can make the generated highlights more easily meet the personalized needs of the local users, for example, it can generate favorite segments and/or disliked segments for the local users.

FIG. 4C illustrates another exemplary method 400c for generating highlights of video content according to an embodiment of the present disclosure. Compared with the method 300 and the method 400a, the method 400c also introduces the evaluation type of evaluations as one of the bases for generating highlights.

Referring to FIG. 4C continuously, the method 400c may further comprise, in operation step 403, obtaining the metadata of video content, wherein the video content includes a plurality of segments, and the metadata represents evaluations from a plurality of users for at least one of the plurality of segments. The metadata includes: the evaluation type of evaluation, and the number of evaluations corresponding to the evaluation type. The operation is similar to the operation step 403 of method 400b, and will not be described in detail here.

Referring to FIG. 4B continuously, the method 400c may further comprise, in operation step 406, generating highlights of the video content for each evaluation type based on a predetermined number of segments corresponding to the evaluation type with the largest number of evaluations. In some embodiments, the predetermined number may be preset by the user or a default value.

For example, when the predetermined number is set to 2, according to the example shown in FIG. 6, for the first evaluation type, highlights may include segments 2 and 8; for the second evaluation type, highlights may include segments 4 and 8; for the third evaluation type, segments 1 and 3 may be included as highlights.

Referring to FIG. 4C continuously, the method 400c may further comprise, in operation step 407, providing a list of highlights listed according to evaluation types to the local users so that they can select the highlights to be played. Taking the above as example, the above segments can be listed separately by evaluation type, and the user can select the highlights to be played. For example, the user may choose to watch the highlights of the first evaluation type and the third evaluation type in turn.

For the method 300 and the methods 400a-c, playing the highlights may comprise providing the start and end time of each segment included in the highlights and marking the start time in the video stream of the local user. The local user can use the remote control and other devices to jump from the start time of one segment to the start time of another segment, so as to realize the jumping and playing of highlights. Moreover, it can effectively reduce the transmission load by providing only a plurality of start and stop times instead of providing the video content of the whole highlights.

According to the embodiment of the present disclosure, by summarizing and counting a plurality of evaluations from a plurality of users, it is possible to generate highlights for the local users that meet their personalized needs, and enable the local users to know the segments that other users are interested in. The local users can perform jump-playing of the generated highlights to watch the content they are interested in and get richer interactive experience. Furthermore, the above operations can be performed at the network device on the terminal side (for example, at the STB), which can reduce the consumption of network resources, improve the network performance, and better match the individual needs of the local users.

Of course, the embodiments of the present disclosure can also be executed on the server side, or part of the operations of the embodiments of the present disclosure can be preliminarily executed by the server. In this way, the data can be preliminarily processed by the server, thus avoiding repeated operations at each terminal, reducing the consumption of local resources, and better protecting the privacy of users possibly involved in the original data.

Figure 5:
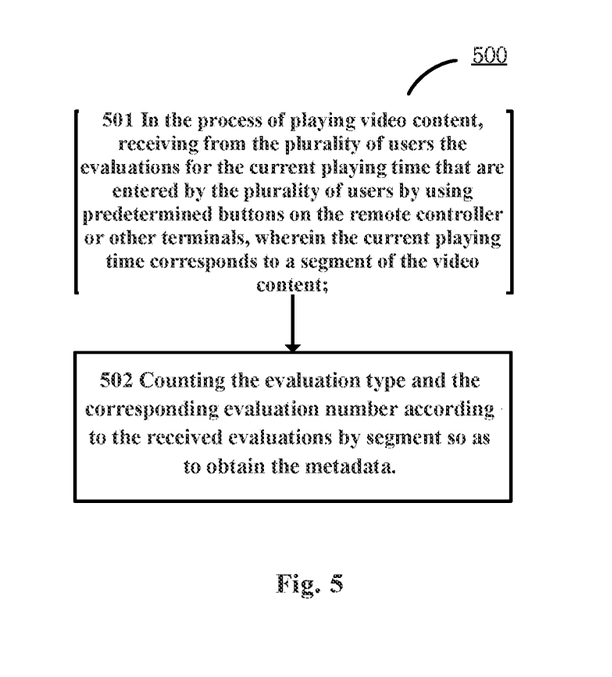
FIG. 5 is a schematic diagram of an exemplary method for acquiring metadata of video content according to an embodiment of the present disclosure.

FIG. 5 is a schematic diagram of an exemplary method 500 for obtaining the metadata of video content according to an embodiment of the present disclosure. Combined with the system environment shown in FIG. 1, the device executing the operation of the method 500 may be the network device 120, the server 140, or both.

The method 500 comprises, in operation step 501, receiving from a plurality of users evaluations for the current playing time entered by the plurality of users by using predetermined buttons on the remote controller or other terminals during the playing of video content, wherein the current playing time corresponds to a segment of the video content.

For example, when the user is playing a sport event and watching an interesting content, a wonderful content or a disliked content, the evaluation of the current playing time can be entered through the remote controller or terminal.

For entering evaluations through a terminal, for example, the mobile phone, computer or other personal terminal of the user can be matched with a STB or a TV, and the specific evaluation content can be entered on the matched personal terminal. Furthermore, the evaluation can be classified into a certain evaluation type according to the specific evaluation content. This classification can be performed by various classification methods, which can be performed by the network device 120, sent to the server 140, or performed by a combination of the two.

The evaluation input through the remote controller may be performed, for example, by pressing a predetermined button or a combination of predetermined buttons on the remote controller.

Since the current remote controller may not be as convenient as a personal terminal with an input method in the process of inputting a complete evaluation, or for the sake of being able to be understood by global viewers when the evaluation is displayed, the remote controller may be configured to input a predetermined emoji as an evaluation by pressing the corresponding button. This scheme can input concise evaluation quickly and achieve the effect of "one key input".

For example, pressing a predetermined color button on the remote controller can quickly input the corresponding emoji to express the emotion or evaluation of the current playing time. For example, pressing the red button can input a smiley face emoji that corresponds to the first evaluation type; pressing the green button can input the crying emoji that corresponds to the second evaluation type; pressing the yellow button can input the flower emoji that corresponds to the third evaluation type, etc. Which button corresponds to which evaluation and which evaluation type can be pre-configured by the user or selected by the user from a database/options. Note: The present disclosure is not limited to the above configuration.

In this example, different predetermined color buttons correspond to different evaluation types, so that the network device 120 can quickly determine the evaluation type of evaluation by detecting that the predetermined color button on the remote controller that is pressed. Therefore, this scheme can quickly input some types of evaluations, and is helpful to quickly determine the evaluation type, so as to obtain the metadata of video content.

In another example, by pressing the combination of color buttons, number buttons or direction keys on the remote controller, specific evaluation contents for evaluations can be further entered. These specific evaluation contents can be several common evaluations selected by users from the database/options, which can be configured in advance. Compared with colored buttons solely, the combination of color buttons, number buttons or direction keys can correspond to a slightly larger number of specific evaluation contents, including emojis, Chinese characters or other universal characters.

In this example, when these specific evaluation contents are pre-configured, they can also have default or designated evaluation types. In this case, the network device 120 can determine the specific evaluation content of the evaluation by detecting that the combination of predetermined buttons on the remote controller is pressed, and can also query and determine the evaluation type of the evaluations according to the specific evaluation content thereof.

In addition to the case described above, the example described below can also be classified in the following ways: in some cases, for example, pressing the red button can expand the emojis related to laughter (corresponding to the first evaluation type), and then pressing different numeric buttons within a threshold time period (e.g., within 3 seconds) can input various specific emojis such as laughter, smile and snickering. In this example, the evaluation type of evaluation can be quickly determined by detecting that the predetermined color button on the remote controller is pressed.

The classification method can also be performed through text extraction, semantic analysis, natural language recognition, and the like. Moreover, the classification operation may also be performed by the server 140 after being uploaded to the server 140.

Each user's information about evaluation (e.g., specific evaluation content, evaluation type, and evaluation/evaluation time stamp for which segment) can be uploaded by each user's network device 120 to the server 140 for the service provider to collect these evaluations.

Next, with continued reference to FIG. 5, the method 500 may further comprise, in operation step 502, counting the evaluation types and the corresponding evaluation numbers of received evaluations by segment so as to obtain metadata.

For each segment that has been evaluated, the evaluation types and corresponding evaluation numbers of these evaluations can be counted, so as to obtain metadata with evaluation types and corresponding evaluation numbers. This operation may be performed by the server 140; it can also be performed by the network device 120 corresponding to the local user who wants to watch the highlights, at which time the network device 120 can receive these evaluations via the server 140.

In addition, the evaluations received by the local users from multiple users can be displayed on the screen in the form of bullet messages at corresponding time to enrich the interactive experience of the local users. The local users can also control the opening and closing of the bullet messages through the remote controller.

According to the embodiment of the present disclosure, in the video playing process, a plurality of users can input several types of evaluations of video segments by pressing predetermined buttons on their respective remote controllers and other devices, and these evaluations can be displayed in the video playing process in the form of bullet messages. This input can be very convenient and time-saving. In addition, through proper configuration, the metadata of video content can be generated conveniently from the evaluations entered, which is helpful to generate highlights for users and enhance the interactive experience of users.

FIG. 6 is a schematic diagram showing a segment of video content according to an embodiment of the present disclosure.

FIG. 6 shows the division of segments, the evaluation types involved, and the evaluation number of each evaluation type in the corresponding segment. When the exemplary method of the embodiment of the present disclosure was described with reference to FIGS. 3-5, it was also described with reference to FIG. 6, so the description of FIG. 6 is not repeated here. It should be noted that FIG. 6 is only an example. In the present disclosure, the division, evaluation type and evaluation number of segments are not limited to this example, nor are the data forms and representation contents of metadata.

The present disclosure may be realized as any combination of devices, systems, integrated circuits, and computer programs on non-transient computer-readable media. One or a plurality of processors may be realized as an integrated circuit (IC), an application-specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transient computer-readable medium, so that a computer with one or a plurality of processors can execute the aforementioned steps and the steps described in the attached drawings. For example, one or a plurality of memories store software or algorithms by executable instructions, and one or a plurality of processors can associate the execution of a set of instructions of the software or algorithms to provide monitoring in any number of wireless networks according to the embodiments described in this disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may comprise dynamic random access memory (DRAM), random access memory (RAM), read-only memory (ROM), electrically erasable programmable read-only memory (EEPROM), compact disk read-only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include Compact Discs (CDs), laser disks, optical disks, Digital Versatile Discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the above features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations should be executed to realize the desired result. In some cases, multi-tasking and parallel processing can be advantageous.

The invention claimed is:

1. A network device, comprising:
a memory having instructions stored thereon;
a processor configured to execute instructions stored on the memory to cause a network device to perform the following operations:
acquiring metadata of video content, wherein the video content comprises a plurality of segments, and the metadata is generated from evaluations entered from a plurality of users for at least one segment of the plurality of segments; and
according to the metadata and preference information set by a local user, generating highlights of the video content for the local user to play;
providing a start time and an end time of each segment of the plurality of segments included in the generated highlights and marking each start time in a video stream provided to the user to allow the user to jump from the start time of the at least one segment to another start time of another segment of the plurality of segments without providing the video content of the generated highlights; and
jumping from one segment of the plurality of segments to another segment of the plurality of segments based on an input, wherein the jumping comprises providing the video content of the generated highlights associated with the start time and the end time associated with the another segment.

2. The network device according to claim 1, wherein the metadata comprises:
evaluation type of the evaluations, and evaluation number of the evaluations corresponding to the evaluation type.

3. The network device according to claim 1, wherein the metadata includes the evaluation number of evaluations, and the processor is further configured to execute instructions stored on the memory to cause the network device to perform the following operations:
generating the highlights of the video content based on a predetermined number of segments with the largest evaluation number, wherein the predetermined number is preset by the user or is a default value.

4. The network device according to claim 2, wherein the preference information of the local user includes weights set by the local user for each evaluation type, and the processor is further configured to execute instructions stored on the memory to cause the network device to perform the following operations:
according to the weights set by the local user for each evaluation type, for each segment in the at least one segment, calculating the weighted sum of the evaluation number of each evaluation type based on corresponding weight, as the weighted total evaluation number of the segment; and
generating the highlights of the video content based on a predetermined number of segments with the largest weighted total evaluation number.

5. The network device of claim 2, wherein the processor is further configured to execute instructions stored on the memory to cause the network device to perform the following operations:
for each evaluation type, based on a predetermined number of segments with the largest evaluation number corresponding to the evaluation type, generating the highlights of the video content for the evaluation type respectively; and
providing a list of highlights listed according to the evaluation type to the local user, from which the local user selects the highlights to be played.

6. The network device of claim 2, wherein obtaining the metadata of the video content further comprises:
in the process of playing video content, receiving from the plurality of users the evaluations for the current playing time entered by the plurality of users by using predetermined buttons on the remote controller or other terminals, wherein the current playing time corresponds to a segment of the video content; and
according to the received evaluations, counting the evaluation types and the corresponding evaluation numbers by segment to obtain the metadata.

7. The network device of claim 6, wherein obtaining the metadata of the video content further comprises:
determining the evaluation type of the evaluation by detecting that the predetermined color button on the remote controller is pressed, wherein different predetermined color buttons respectively correspond to different evaluation types.

8. The network device of claim 6, wherein obtaining the metadata of the video content further comprises:
determining the specific evaluation content of the evaluation by detecting that the predetermined color button on the remote controller is pressed and then within a threshold time period the predetermined digital button on the remote controller is pressed, wherein the specific evaluation content includes emojis, characters or other universal characters; as well as classifying the evaluation according to the specific evaluation content to determine the evaluation type of the evaluation.

9. A method executed by a network device, wherein the method comprises:
acquiring metadata of video content, wherein the video content comprises a plurality of segments, and the metadata is generated from evaluations entered from a plurality of users for at least one of the plurality of segments; and
according to the metadata and the preference information set by the local users, generating highlights of the video content for the local users to play;
providing a start time and an end time of each segment of the plurality of segments included in the generated highlights and marking each start time in a video stream provided to the user to allow the user to jump from the start time of the at least one segment to another start time of another segment of the plurality of segments without providing the video content of the generated highlights; and
jumping from one segment of the plurality of segments to another segment of the plurality of segments based on an input, wherein the jumping comprises providing the video content of the generated highlights associated with the start time and the end time associated with the another segment.

10. The method of claim 9, wherein the metadata comprises:
the evaluation type of evaluation, and the number of evaluations corresponding to the evaluation type.

11. The method of claim 9, wherein the metadata includes the number of evaluations, and generating highlights of the video content for the local users further comprises:
generating highlights of the video content based on a predetermined number of segments with the largest number of evaluations, wherein the predetermined number is preset by the user or is a default value.

12. The method of claim 10, wherein the preference information of the local user includes weights set by the local user for each evaluation type, and generating highlights of the video content for the local user further comprises:
according to the weight set by the local user for each evaluation type, for each segment in the at least one segment, calculating the weighted sum of the evaluation number of each evaluation type based on the corresponding weight as the weighted total evaluation number of the segment; and
generating highlights of the video content based on a predetermined number of segments with the largest number of weighted total evaluations.

13. The method of claim 10, wherein generating highlights of the video content for the local user further comprises:
for each evaluation type, based on the predetermined number of segments with the largest number of evaluations corresponding to the evaluation type, generating the highlights of the video content for the evaluation type respectively; and
providing a list of highlights listed according to the evaluation type to the local users for the local users, from which the local users may select the highlights to be played.

14. The method of claim 10, wherein obtaining metadata of the video content further comprises:
in the process of playing video content, receiving from the plurality of users the evaluations for the current playing time entered by the plurality of users by using predetermined buttons on the remote controller or other terminals, wherein the current playing time corresponds to a segment of the video content; and
according to the received evaluations, counting the evaluation types and the corresponding evaluation numbers by segment to obtain the metadata.

15. The method of claim 14, wherein obtaining metadata of the video content further comprises:
determining the evaluation type of evaluation by detecting the predetermined color button on the remote controller that is pressed, wherein different predetermined color buttons respectively correspond to different evaluation types.

16. The method of claim 14, wherein obtaining metadata of the video content further comprises:
determining the specific evaluation content of the evaluation by detecting that the predetermined color button on the remote controller is pressed and then within a threshold time period the predetermined digital button on the remote controller is pressed, wherein the specific evaluation content includes emojis, characters or other universal characters; as well as
classifying the evaluations according to the specific evaluation contents to determine the evaluation type of the evaluations.

17. A non-transitory computer-readable medium having instructions stored thereon that, when executed by a processor of a network device, cause the network device to perform the following operations:
acquiring metadata of video content, wherein the video content comprises a plurality of segments, and the metadata is generated from evaluations entered from a plurality of users for at least one of the plurality of segments; and
according to the metadata and the preference information set by the local users, generating highlights of the video content for the local users to play;
providing a start time and an end time of each segment of the plurality of segments included in the generated highlights and marking each start time in a video stream provided to the user to allow the user to jump from the start time of the at least one segment to another start time of another segment of the plurality of segments without providing the video content of the generated highlights; and
jumping from one segment of the plurality of segments to another segment of the plurality of segments based on an input, wherein the jumping comprises providing the video content of the generated highlights associated with the start time and the end time associated with the another segment.

18. The non-transitory computer-readable medium according to claim 17, wherein the metadata comprises:

the evaluation type of evaluation, and the number of evaluations corresponding to the evaluation type.

19. The non-transitory computer-readable medium according to claim 17, wherein the metadata includes the number of evaluations, and the non-transitory computer-readable medium further includes instructions that, when executed by the processor of a network device, cause the network device to perform the following operations:

generating highlights of the video content based on a predetermined number of segments with the largest number of evaluations, wherein the predetermined number is preset by the user or is a default value.

20. The non-transitory computer-readable medium according to claim 18, wherein the preference information of the local user includes weights set by the local user for each evaluation type, and the non-transitory computer-readable medium further includes instructions that, when executed by the processor of a network device, cause the network device to perform the following operations:

according to the weight set by the local user for each evaluation type, for each segment in the at least one segment, calculating the weighted sum of the evaluation number of each evaluation type based on the corresponding weight as the weighted total evaluation number of the segment; and generating highlights of the video content based on a predetermined number of segments with the largest number of weighted total evaluations.

21. The non-transitory computer-readable medium according to claim 18, further comprising instructions that, when executed by the processor of a network device, cause the network device to perform the following operations:

in the process of playing video content, receiving from the plurality of users the evaluations for the current playing time entered by the plurality of users by using predetermined buttons on the remote controller or other terminals, wherein the current playing time corresponds to a segment of the video content; and according to the received evaluations, counting the evaluation types and the corresponding evaluation numbers by segment to obtain the metadata.

22. The non-transitory computer-readable medium according to claim 21, further comprising instructions that, when executed by the processor of a network device, cause the network device to perform the following operations:

determining the evaluation type of evaluation by detecting the predetermined color button on the remote controller that is pressed, wherein different predetermined color buttons respectively correspond to different evaluation types.

* * * * *